United States Patent [19]
Veronesi

[11] 3,730,351
[45] May 1, 1973

[54] DISPOSABLE BLOOD DIALYSER UNIT

[75] Inventor: Mario Nino Veronesi, Mirandola, Italy

[73] Assignee: Sterilplast S.p.A., Mirandola, Italy

[22] Filed: July 1, 1971

[21] Appl. No.: 158,730

Related U.S. Application Data

[63] Continuation-in-part of Ser. No. 20,305, March 17, 1970, abandoned.

[30] Foreign Application Priority Data

Mar. 27, 1969 Italy................31044 A/69

[52] U.S. Cl..................................210/321
[51] Int. Cl. ................................B01d 31/00
[58] Field of Search.................210/22, 321, 541

[56] References Cited

UNITED STATES PATENTS

| | | | |
|---|---|---|---|
| 3,567,028 | 3/1971 | Nose.................. | 210/321 X |
| 3,522,885 | 8/1970 | Lavender et al........ | 210/321 |
| 3,342,328 | 9/1967 | Swenson................ | 210/321 X |
| 3,488,690 | 1/1970 | Ross et al. ........... | 210/541 X |

Primary Examiner—Frank A. Spear, Jr.
Attorney—Gerald D. Sharkin et al.

[57] ABSTRACT

The invention concerns an improved dialyser unit of flat rectangular construction, comprising a flat membrane envelope provided with a blood inlet at one end and a blood outlet at the other end, membrane support material covering the two outer surfaces of the membrane envelope and being made up of an inner series of coplanar parallel strands against the outer surfaces of the membrane envelope and an outer series of coplanar parallel strands crossing the inner series of the side outwardly of the membrane envelope, spacer elements arranged across the free outer series of coplanar parallel strands of the membrane support material, and a housing having a dialysate inlet and outlet, defining a dialysate flow passage with the spacer elements and outer surfaces of the membrane envelope, the inner series of coplanar parallel strands of the membrane support material against the one outer surface of the membrane envelope being arranged at an angle relative to the inner series of coplanar parallel strands against the other outer surface of the membrane envelope.

1 Claim, 5 Drawing Figures

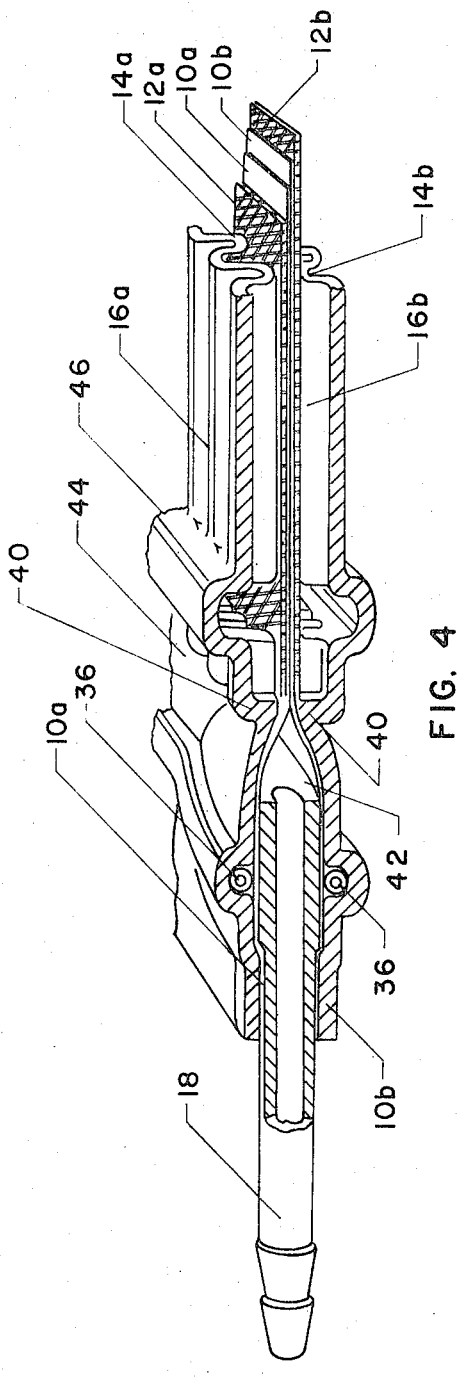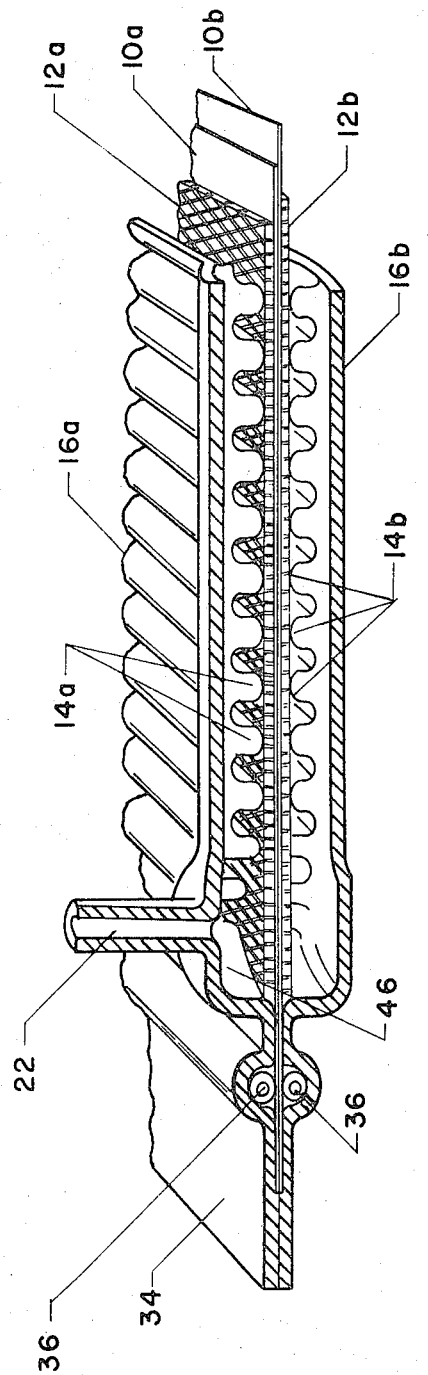

DISPOSABLE BLOOD DIALYSER UNIT

This is a continuation in part of copending application Ser. No. 20,305 filed on Mar. 17, 1970, now abandoned.

The invention relates to an improved blood dialyser unit of the rectangular Kiil type. More particularly, the invention concerns a dialyser unit of the type comprising a membrane envelope through which blood may be passed, netting structures to each side of the membrane envelope to support the surfaces of the membrane envelope, and a housing enclosing the membrane envelope and netting structures and defining dialysate flow passages with the membrane envelope. Several dialyser units of this type are known. Thus, for example, there is described in U.S. Pat. No. 3,448,690, a dialyser unit employing netting support structures adjacent a membrane envelope.

Preparation of a haemodialyser can be a time-consuming operation, particularly where the dialyser unit itself needs to be dismantled, cleaned, sterilised and then reconstructed. Also, many dialyser units can suffer from a series of defects following on repeated use. It is one object of this invention to provide a dialyser unit of the type described which is of low cost and simple construction which may be disposed of after use.

Careful priming of the dialyser unit normally needs to be effected to eliminate all air contained in the unit. To ensure that no air is entrained in blood returned to the body from the dialyser unit, the haemodialyser assembly is generally provided with an air trap, or so-called debubbler. The flat rectangular dialyser unit of the type here contemplated is generally clamped between two rigid clamp plates so that the unit is prevented from bulging and will retain its flat condition while dialysate and blood are being passed through the dialyser unit. In some constructions, an inflatable shim is provided between the plates so that the clamping force for maintaining the dialyser unit in flat condition is not localised at a point (which may cause damage to the dialyser unit) but is spread over and against one flat surface of the dialyser unit to provide an even pressure. In priming the dialyser unit with blood it is conventional to tilt the clamp plates and hence the dialyser unit about a horizontal axis so that the blood inlet leading to the membrane envelope is at a lower lever below the blood outlet leading from the membrane envelope. This tilting operation is carried out in an endeavour to expel air wijhin the membrane envelope by filling this with blood from the lower level so that the air will be expelled through the outlet as the leading face of the blood moves upwardly towards the outlet during priming. It is an object of this invention to provide a construction in which the likelihood of entrapping air in the membrane envelope during priming is reduced.

It is recognised in the field of blood dialysis that it is of advantage that the blood flowing through the membrane envelope be spread in a thin layer in order to achieve efficient dialysis. Also, localised channelling of the blood should as far as possible be avoided. Further, since laminar flow of blood can result in only the outer laminates of blood being subjected to dialysis, it is desirable that blood flow through the membrane envelope be turbulent. At the same time, it is advantageous that the resistance to flow of blood through the membrane envelope not be great since otherwise a blood pump is required during the haemodialysis operation. For reasons similar to the fact that turbulent blood flow is desirable, it is also desirable that dialysate flow adjacent the membrane surfaces be turbulent. The dialyser unit of the present invention meets these requirements particularly simply and effectively, as will more readily be understood from the following description.

In accordance with the invention, there is provided a disposable blood dialyser unit of flat rectangular construction, comprising a flat membrane envelope provided with a blood inlet at one end and a blood outlet at the other end, membrane support material covering the two outer surfaces of the membrane envelopw and being made up of an inner series of coplanar parallel strands against the outer surfaces of the membrane envelope and an outer series of coplanar parallel strands crossing the inner series on the side outwardly of the membrane envelope, spacer elements arranged across the free outer series of envelope parallel strands of the membrane support material, and a housing having a dialysate inlet and outlet, defining a dialysate flow passage with the spacer elements and outer surfaces of the membrane envelope, the inner series of coplanar parallel strands of the membrane support material against the one outer surface of the membrane envelope being arranged at an angle relative to the inner series of coplanar parallel strands against the other outer surface of the membrane envelope.

The flat membrane envelope may conveniently be made up from two substantially rectangular sheets of membrane material superimposed on one another and sealed together inwardly of their edges. The blood inlet and blood outlet can in this arrangement be sealed between the sheets so that the one sheet is sealed onto the one side of the blood inlet and blood outlet and the other sheet is sealed onto the other side of said inlet and outlet. The inlet and outlets are thus conveniently of flat tongue-like form.

The membrane support material covering the membrane envelope may also be in the form of two rectangular sheets. The nature and function of the membrane support material in the dialyser unit of the invention will be most readily understood from the later description herein, with reference to the accompanying drawings. However, the support material preferably constitutes a plastic net structure made up of a first series of coplanar parallel plastic strands and a second series of coplanar parallel plastic strands bonded across and to each of said first series. Such bonded structure has the advantage that the strands making up the support material cannot be displaced relative to one another. Of particular importance is that the membrane support material covering the two outer surfaces of the membrane envelope can be pressed together by the clamping action of clamp plates acting on the housing, without impeding flow of blood through the membrane envelope. In general, it has previously been necessary to provide spacer elements between membrane supports so that the membrane envelope is free to part and so define a passage for blood flow. Additionally, or sometimes alternatively, elements have been arranged against the surfaces of the membrane envelope in staggered relationship so as to deform the membrane profile to cause turbulence in the blood as it flows through the envelope. The membrane support material employed in the dialyser unit of the present invention results in the membrane envelope taking up a profile which creates a particularly efficient type of turbulence in the blood.

Apart from creating a state of turbulence in the blood, it is desirable that turbulence exist in the dialysate. A certain degree of turbulence in the dialysate occurs in most constructions by virtue of the irregular profile of the membrane envelope during use. In the dialyser unit of the present invention, the two inner series of coplanar parallel strands of membrane support material against the two outer surfaces of the membrane envelope will, in effect, be embedded in the membrane envelope by virtue of bulging of the membrane envelope between the strands during use. The outer two series of coplanar parallel strands crossing the said two inner series of strands will however effectively be within the dialysate flow passage defined by the housing and spacer elements and outer surfaces of the membrane envelope. The outer series of strands are in close proximity of the outer surfaces of the membrane envelope and serve to create desirable additional turbulence in the dialysate immediately adjacent the outer surfaces of the membrane envelope.

As has already been indicated, the inner series of coplanar parallel strands of the membrane support material against the one outer surface of the membrane envelope are arranged at an angle relative to the inner series of coplanar parallel strands against the other outer surface of the membrane envelope. It will be readily appreciated that the one series of strands will, during use of the dialyser unit, result in the one surface of the membrane envelope taking up a channelled profile series between and along the length of the series of strands against said surface, and the other surface of the membrane envelope taking up a similar channelled profile series along the length of the series of strands against said other surface at angle to the first mentioned channelled profile. Where the membrane support material covering the surfaces of the membrane envelope is held close together, for example by clamp plates acting on the housing, the membrane envelope will define a cross-channel system with the peaks of the channels touching at points where the series of strands against the one outer surface of the membrane support envelope cross the series of strands arranged at an angle against the other outer surface of the membrane envelope.

The channelled profile series taken up by the membrane envelope will naturally influence the nature and direction of blood flow through the membrane envelope. Thus, the one channelled profile series will incline blood flow along the length of its series of channels, while the other channelled profile series will in turn incline blood flow along its series of channels at an angle to the first mentioned series of channels. As a first consideration, in order to obtain a consistent degree of dialysis, it is desirable that blood flow not be inclined to any particular region within the membrane envelope. This point, together with other desirable characteristics, is effectively achieved by arranging the series of coplanar parallel strands against the one outer surface of the membrane envelope at a determined acute angle to one side of the overall direction of blood flow in the membrane envelope, i.e., at a determined angle to one side of the longitudinal axis of the flat rectangular blood dialyser unit here contemplated, and arranging the series of coplanar strands against the other outer surface of the membrane envelope at the same determined acute angle to the other side of the overall direction of blood flow. It has been indicated that an object of the invention is to provide a construction in which the likelihood of entrapping air in the membrane envelope during priming is reduced. The arrangement of the series of coplanar strands at said determined acute angles results in blood flow in the membrane envelope being inclined to one side of the overall direction of blood flow by the one series of coplanar strands and to the other side of the overall direction of blood flow by the other series of coplanar strands. Thus, a spreading action takes place on blood feeding into the membrane envelope, which in priming results in the formation of a substantially linear leading face of blood normal to the overall direction of blood flow. The formaton of said linear leading face can be employed to advantage in expelling air which may be contained in the membrane envelope particularly in a construction where said leading face can be made to extend across the entire width of the membrane envelope from the time of entry of blood into the effective dialysis area of the membrane envelope. In order to achieve this function, a blood distribution channel extending across the width of the dialyser unit may be provided at the inlet end of the dialyser unit. The distribution channel may conveniently comprise a marginal region of the membrane envelope which is capable of bulging or diverging outwardly away from the seal to define a wedge-sectioned distribution channel. This function may be achieved by leaving a marginal region of the membrane envelopes uncovered by the support material or by flattening the support material so that the membrane envelope is free to part at said marginal region. One or more blood inlets leading into the envelope, i.e., in this construction into the marginal region may be provided.

The outlet end of the dialyser unit can similarly be provided with a blood collection channel so that blood having passed through the membrane envelope can collect and pass through the outlet from the membrane envelope. Conveniently, the arrangement of the blood distribution channel and inlet and blood collection channel and outlet are identical so that blood may be passed through the envelope in either direction. The one or more blood inlets and outlets may conveniently have openings flared outwardly along the width of the membrane envelope to encourage distribution of blood along the distribution channel. The spacer elements against the free outer series of coplanar parallel strands of the membrane essentially serve the function of providing a dialysate flow passage between the inner surfaces of the housing and the membrane envelope. The spacer elements conveniently form part of the housing itself, which may comprise a pair of rectangular plastic mouldings with suitable spacer elements provided on the inner surfaces. The spacer elements may, for example, be defined by longitudinally arranged corrugations, which additionally serve to strengthen the overall construction of the dialyser unit.

The housing, which is provided with a dialysate inlet and outlet, defines the dialysate flow passage with the spacer elements and outer surfaces of the membrane envelope. As mentioned, the housing may comprise a pair of rectangular plastic mouldings. These mouldings may conveniently be provided with flat marginal areas about the mouldings where they may be sealed together with the spacer elements (which may form part of the housing), membrane support material and membrane envelope between them. A seal, e.g., of rubber, may furthermore be provided inwardly of said flat marginal region, between which sheets of membrane material which may make up the membrane envelope may be sealed. Inwardly of the seal, the housing mouldings may conveniently be provided with a shoulder, which along the longitudinal length is approximately coplanar with the flat marginal regions, between which a correspondingly narrow marginal region of the membrane support material will be clamped upon sealing the mouldings together. In this fashion, the membrane support material can be held in position within the dialyser unit.

The housing mouldings may be moulded to define dialysate distribution and collection channels at the inlet and outlet ends of the dialyser unit. These channels assist in achieving homogeneous flow of dialysate over the membrane envelope and to reduce formation of high and low pressure zones in the dialysate as it enters and leaves the dialyser unit.

An embodiment of a dialyser unit in accordance with the invention will now be described with reference to the accompanying drawings, in which:

FIG. 4 shows a part perspective view and part cross-section taken at A—A of FIG. 2;

FIG. 5 shows a part perspective view and part cross-section taken at B—B of FIG. 2.

Figure 1:
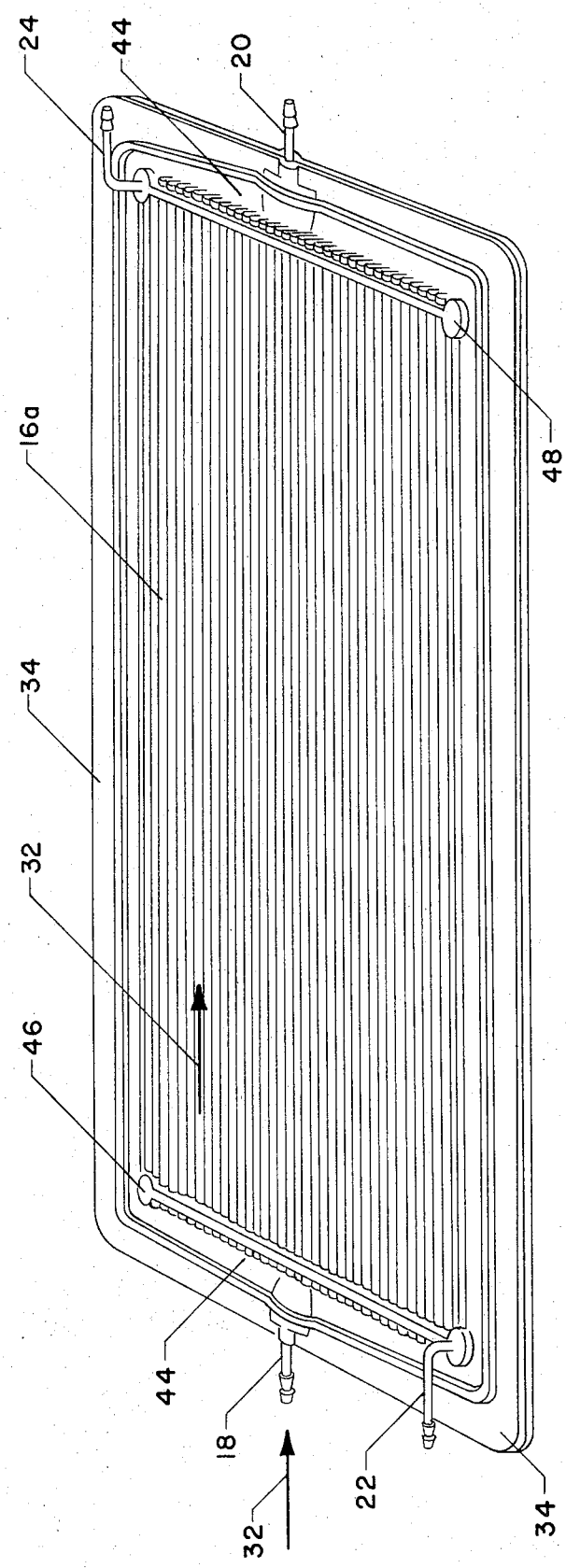
FIG. 1 shows a view in perspective of an assembled dialyser unit.
Figure 2:
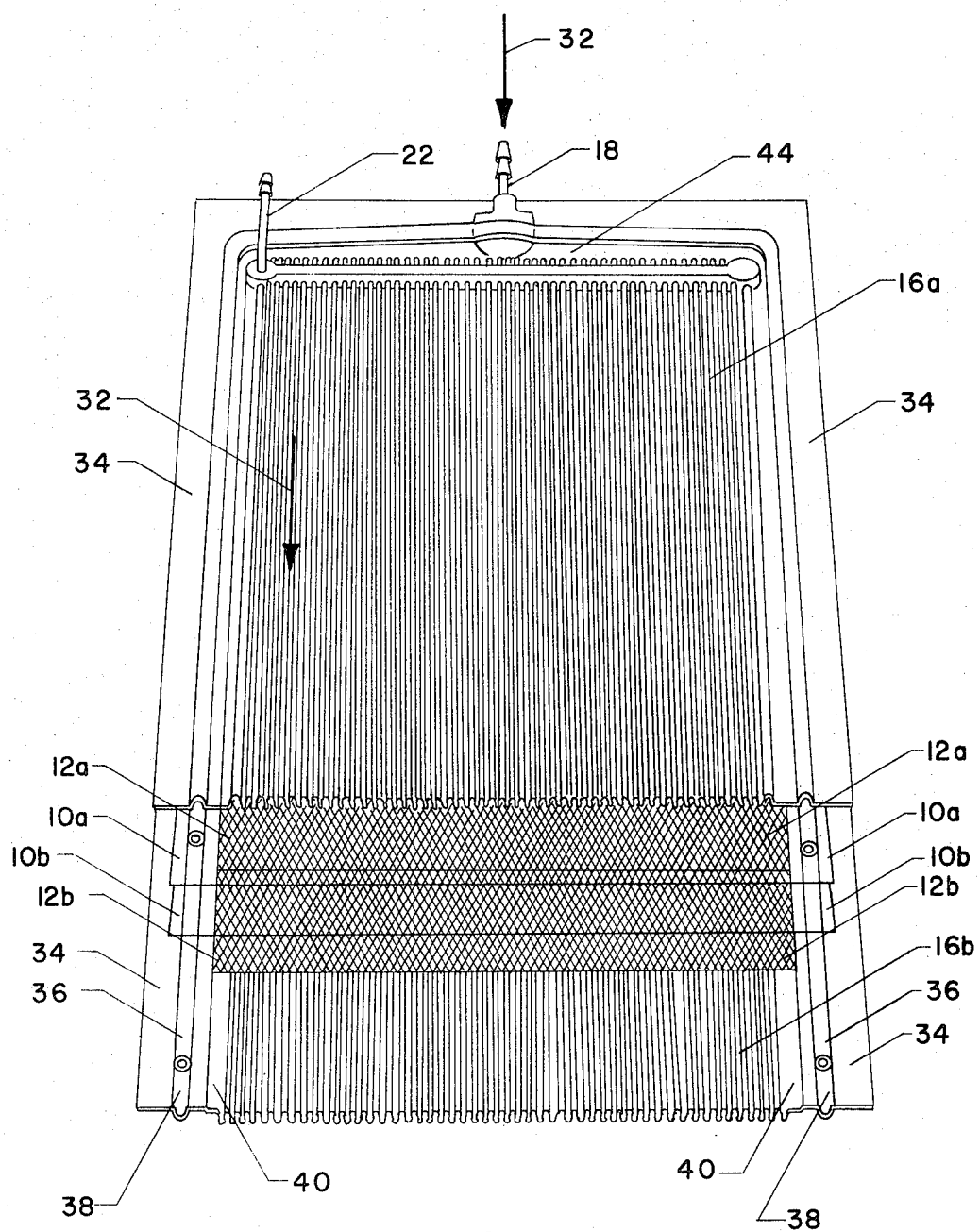
FIG. 2 shows another view of the dialyser unit of FIG. 1 which is part cut-away to show the inside of the unit.

Referring in combination to FIGS. 1 and 2, the flat rectangular dialyser unit comprises a flat membrane envelope made up from two rectangular sheets 10a and 10b of membrane material, two sheets of membrane support material 12a and 12b covering the membrane envelope, spacer elements comprising two series of corrugations 14a and 14b, and a housing comprising a pair of rectangular plastic moulding 16a and 16b.

The membrane envelope has a blood inlet 18 and a blood outlet 20, and each of the plastic mouldings 16a and 16b carries a dialysate inlet 22 and dialysate outlet 24. These inlets and outlets are identical and the construction is such that inlets and outlets are reversible.

Figure 3:
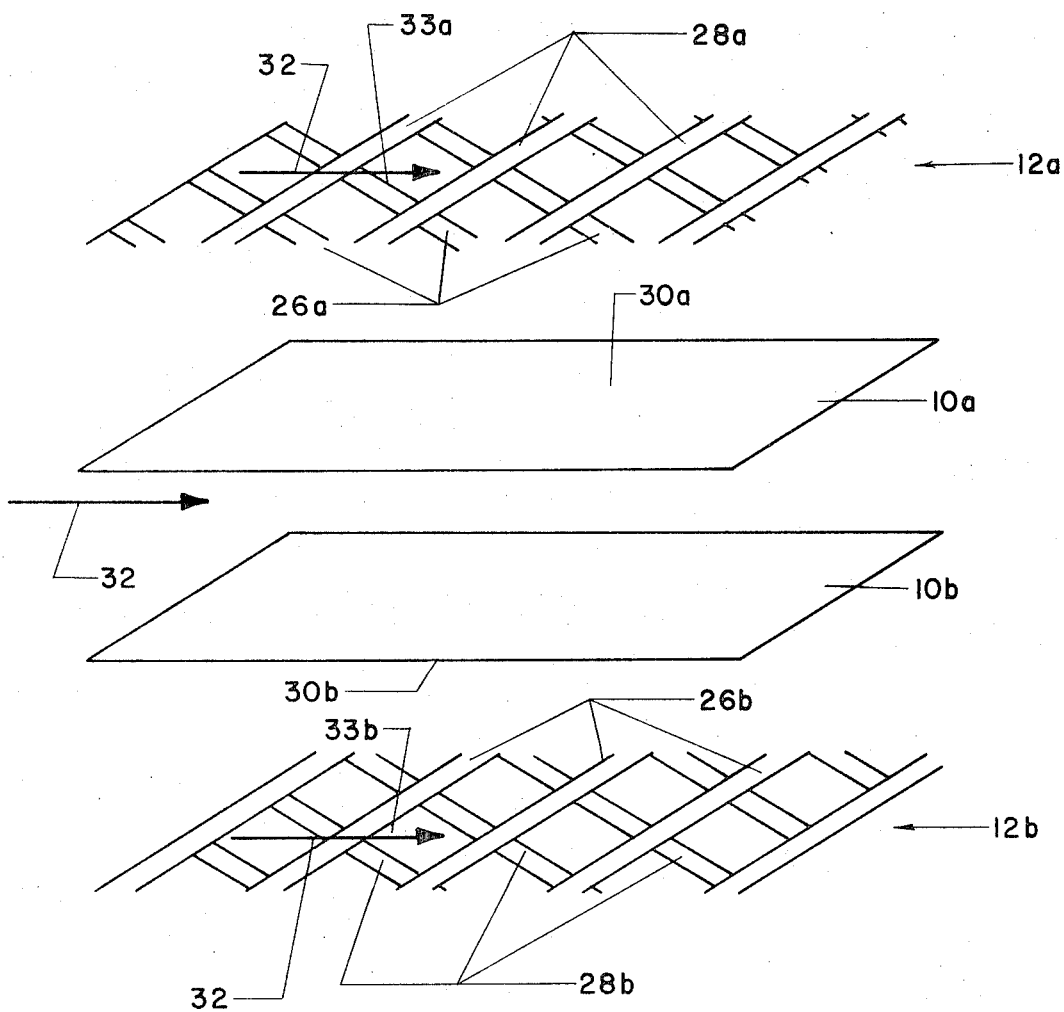
FIG. 3 shows an exploded perspective view in detail of membrane envelope and membrane support material within the dialyser units shown in FIGS. 1 and 2.

As can best be seen from detailed FIG. 3, each of the two sheets 12a and 12b of membrane support material are made up of an inner series of coplanar parallel strands 26a and 26b respectively and an outer series of coplanar parallel strands 28a and 28b crossing said inner series on the side outwardly of the sheets of membrane material 10a and 10b. In the assembled or unexploded situation, the inner series of coplanar parallel strands 26a would be against the outer surface 30b of the sheet of membrane material 10b. As will be seen from the FIG. 3, the inner series of strands 26a and 26b are at an angle to one another. Not shown in detailed FIG. 3, but as will be clear from FIGS. 2, 4 and 5, the spacer elements comprising the two series of corrugations 14a and 14b will in the assembled situation of FIG. 3 be situated across the free outer series of coplanar parallel strands 28a and 28b.

Overall blood flow direction (which corresponds in direction to the longitudinal axis of the rectangular dialyser) is in the FIGS. 1, 2, and 3 indicated by arrows 32. As can be seen from FIGS. 2 and 3 the one inner series of coplanar parallel strands 26a is arranged at an acute angle 33a to one side of the overall blood flow direction and the other inner series of coplanar parallel strands 26b is arranged at the same angle 33b to the other side of the overall blood flow direction.

Referring particularly to FIGS. 2 and 5, the rectangular plastic mouldings 16a and 16b making up the housing are provided with flat marginal areas 34 about the mouldings where they may be sealed together, e.g., by heat or solvent sealing. A seal 36 located in a notch 38 is provided inwardly of the marginal region. The sheets of membrane material 10a and 10b are sealed together along the seal 36 inwardly of their edges to form the membrane envelope. Inwardly of the seal 36, the housing mouldings are provided with shoulders 40, between which narrow marginal regions of the two sheets of membrane support material 12c and 12b are clamped and thus held in position within the dialyser unit.

Referring particularly to FIG. 4, the inlet end is provided with a blood distribution channel (not shown) but which exists between the seal 36 and the shoulder 40 along the width of the dialyser unit. The blood inlet 18 is of flat tongue-like construction and has a mouth 42 which is flared outwardly along the width of the membrane envelope, i.e., along the length of the distribution channel. The blood inlet is sealed between the sheets 10a and 10b of membrane material. It will be appreciated from FIGS. 1, 2 and 4 that the distribution channel exists in the region 44 since the sheets of membrane support material 12a and 12b stop short of the seal 36. Unlike the arrangement along the longitudinal edges shown in the cut-away section of FIG. 2, there exists along the width of the dialyser unit a space between the seal 36 and the shoulder 40 within which the membrane envelope can diverge or bulge outwardly away from the seal and thus define the distribution channel.

The housing mouldings 16a and 16b are at each end moulded to define dialysate distribution and collection channels 46 and 48.

In priming the dialyser unit, blood passes through the flared mouth 42 of the inlet 18 into the membrane envelope to first form a line of blood at the seal along the distribution channel in the region 44. Air which is in the distribution channel, e.g., that which has flowed in from the inlet should normally be located ahead of the leading face of the flood since priming is effected with the inlet end at a lower level. When the blood moves upwardly from the lower distribution channel and between the sheets of membrane support material 12a and 12b, a spreading action takes place on the blood, which by virtue of the arrangement of strands 26a and 26b maintains a substantially linear leading face of blood. Thus, the entire width of the dialyser unit is continuously traversed by a substantially linear leading face of blood during priming and the formation of air pockets or blocked areas is thus discouraged.

In operation, the cross channel system maintains a desirable state of turbulence in the blood. The dialysate flows between the corrugations 14a and 14b and turbulence in a direction substantially countercurrent to turbulence in the blood is created at the surfaces of the membrane envelope by the free series of outer strands 28a and 28b of the membrane support materials.

What is claimed is:

1. A disposable blood dialyser unit of flat rectangular construction, comprising a flat membrane envelope provided with a blood inlet at one end and a blood outlet at the other end, membrane support material covering the two outer surfaces of the membrane envelope and being made up of an inner series of coplanar parallel strands against the outer surfaces of the membrane envelope and the outer series of coplanar parallel strands crossing the inner series on the side outwardly of the membrane envelope, spacer elements arranged across the free outer series of coplanar parallel strands of the membrane support material, and a housing having a dialysate inlet and outlet, defining a dialysate flow passage with the spacer elements and outer surfaces of the membrane envelope, the inner series of coplanar parallel strands of the membrane support material against the one outer surface of the membrane envelope being arranged at a determined acute angle to one side of the overall blood flow direction through the membrane envelope and the other series of coplanar parallel strands being arranged at the same determined acute angle to the other side of the overall blood flow direction.

* * * * *